United States Patent
Kimura et al.

[11] Patent Number: 5,358,453
[45] Date of Patent: Oct. 25, 1994

[54] COGGED V-BELT

[75] Inventors: Taisuke Kimura; Hiroyuki Okawa, both of Hyogo, Japan

[73] Assignee: Mitsuboshi Belting Ltd., Kobe, Japan

[21] Appl. No.: 135,794

[22] Filed: Oct. 13, 1993

[51] Int. Cl.$^5$ .............................................. F16G 5/20
[52] U.S. Cl. ..................................... 474/238; 474/153
[58] Field of Search .............. 474/237, 238, 249–251, 474/153, 265

[56] References Cited

U.S. PATENT DOCUMENTS

| | | |
|---|---|---|
| 4,002,082 | 1/1977 | Waugh . |
| 4,047,446 | 9/1977 | Speer ................................... 474/238 |
| 4,255,146 | 3/1981 | Standley . |
| 4,264,314 | 4/1981 | Imamura . |
| 4,614,509 | 9/1986 | Tangorra et al. ................ 474/153 X |

FOREIGN PATENT DOCUMENTS

| | | |
|---|---|---|
| 53-118655 | 10/1978 | Japan . |
| 54-95663 | 5/1979 | Japan . |
| 57-24997 | 5/1982 | Japan . |

Primary Examiner—Michael Powell
Attorney, Agent, or Firm—Wood, Phillips, VanSanten, Hoffman & Ertel

[57] ABSTRACT

A power transmission belt having a belt body with a length and a plurality of cogs spaced lengthwise along the belt body for engaging a pulley with which the belt cooperates. Adjacent cogs are configured (i.e. shape, length and pitch) and relatively located (i.e. spaced) so that the adjacent cogs contact each other as the power transmission belt is wrapped around a cooperating pulley having a diameter of 60–130 mm. The space between the cogs is thus temporarily at least partially eliminated. In one form, the cogs squeeze together so that adjacent abutting cogs and the engaged cooperating pulley momentarily define a solid mass so that percussion noise is minimized.

21 Claims, 2 Drawing Sheets

COGGED V-BELT

BACKGROUND OF THE INVENTION

1. Field of the Invention

This invention relates to power transmission belts and, more particularly, to a power transmission belt having cogs spaced at regular intervals along the length of the belt.

2. Background Art

Cogged V-belts are well known in the prior art. The cogged V-belt drives/is driven by reason of frictional forces developed between the laterally oppositely facing side surfaces thereof and the facing surfaces on a cooperating V-grooved pulley. The cogged construction gives the belt considerable flexibility to thereby minimize power loss and frictional heat generation resulting from flexing of the belt in operation. Thus, fatigue due to continuous flexing is reduced which results in extension of the useful life of the belt.

The cogged V-belt has a wide field of application. The cogged construction is used, for example, on variable speed belts, belts for driving automotive accessories, belts for driving agricultural machinery, etc.

One drawback with the cogged V-belt is that it generates a harsh percussion noise in use. This noise develops as each cog engages with and disengages from a cooperating pulley. This noise is identified in the industry as "pitch noise".

A greater "pitch noise" is generated between the cogged belt and a driving pulley than between the cogged belt and a driven pulley. Also, a more significant "pitch noise" is developed as the belt engages a pulley than when it disengages therefrom.

More particularly, the "pitch noise" is generated as follows. As the cogs enter a pulley and contact the laterally spaced surfaces bounding the pulley groove, the cogs, in succession, become momentarily stressed, thereby continuously generating the harsh noise. The space between the cogs allows the impact sound to reverberate. This is particularly a problem with V-belts travelling at high speeds, under which conditions the cogs are driven more frequently and forcibly into contact with the pulley surfaces to produce an even harsher, high frequency noise.

Various attempts have been made in the prior art to prevent the "pitch noise" that results from operation of conventional cogged V-belts. One such proposed solution is described in Japanese utility model publication 57-24997 (1982). The cogged V-belt therein has lateral notches on the inside surface of the cogs. As a result, the pitch and height of the cogs are random. While the notches account for a significant suppression of "pitch noise", the notches at the same time weaken the cogs. The cogs tend to crack at the notches, which shortens the life of the belt.

Another proposed solution to the "pitch noise" problem is described in Japanese Utility Model Application Laid-Open 54-95663 (1979). The belt disclosed therein is a V-belt with cogs having a V-shaped cross section. The cogs are formed in a rubber layer having a hardness less than that of the rubber in the compression layer. While a softer rubber accounts for less noise generation, the softer rubber wears out and deforms more readily in use, thereby shortening the useful life of the belt.

SUMMARY OF THE INVENTION

It is a principal objective of the present invention to provide a cogged belt which is resistant to wear, cracking, and deformation, yet one which significantly reduces harsh, high-frequency noise ("pitch noise") that is developed during operation of conventional cogged belts.

In one form of the invention, the above objectives are accomplished by providing a power transmission belt having a belt body with a length and a plurality of cogs spaced lengthwise along the belt body for engaging a pulley with which the belt cooperates. Adjacent cogs are configured (i.e. shape, length and pitch) and relatively located (i.e. spaced) so that the adjacent cogs contact each other as the power transmission belt is wrapped around a cooperating pulley having a diameter of 60–130 mm. The space between the cogs is thus temporarily at least partially eliminated. In one form, the cogs squeeze together so that adjacent abutting cogs and the engaged cooperating pulley momentarily define a solid mass so that the harsh percussion noise is not generated.

The power transmission belt, which may be a V-belt, has a longitudinal pitch line and an outside surface. The adjacent cogs contact each other at a predetermined distance from the outside surface, with the ratio of the length of the adjacent cogs, taken along a first line parallel to the pitch line at the predetermined distance from the outside surface, to the length of the space between the adjacent cogs along the first line, being between 3 and 10.

The adjacent cogs have adjacent leading and trailing flank surfaces. A line tangent to the leading flank surface at the predetermined distance from the outside surface makes an angle $\alpha 1$ with a line perpendicular to the pitch line. A line tangent to the trailing flank surface at the predetermined distance from the outside surface makes an angle $\alpha 2$ with the line perpendicular to the pitch line. Preferably, the sum of $\alpha 1$ and $\alpha 2$ is not greater than 30°.

$\alpha 1$ and $\alpha 2$ may be equal or different, with the latter accounting for a non-symmetrical cog shape.

In one form, the leading and trailing cogged flank surfaces are convex. The overall shape of the cog is preferably round, but may be otherwise.

The power transmission belt may have laterally spaced, longitudinally extending, load carrying cords made from at least one of polyester, polyamide, and aromatic polyamide fibers. In one form, the cords are embedded in an adhesion layer that is at least one of rubber and elastic synthetic resin.

A fabric, such as one of bias and stretchable canvas, may be provided on the outside of the belt.

The invention also contemplates the above belt in combination with a pulley having a diameter of 60–130 mm.

In another form of the invention, a power transmission system is provided including a) a power transmission belt having a belt body with a length and a plurality of cogs spaced lengthwise along the belt body and b) a pulley having a drive/driven surface to be engaged by the power transmission belt. The adjacent cogs are configured and relatively located so that the adjacent cogs contact each other as the power transmission belt wraps around the pulley.

The cogs are preferably consistently spaced a predetermined distance from each other along the entire length of the power transmission belt.

DETAILED DESCRIPTION OF THE DRAWINGS

Figure 1:
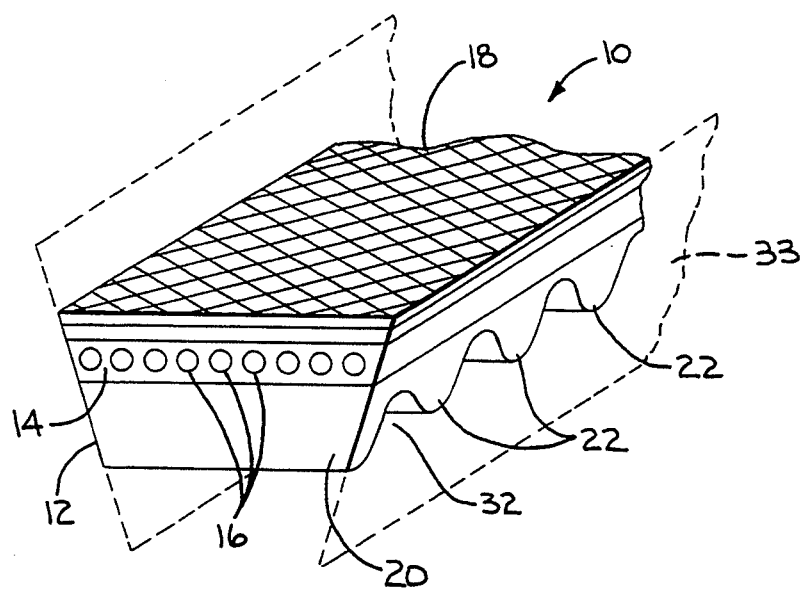
FIG. 1 is an enlarged, fragmentary, perspective view of a cogged V-belt according to the present invention.
Figure 2:
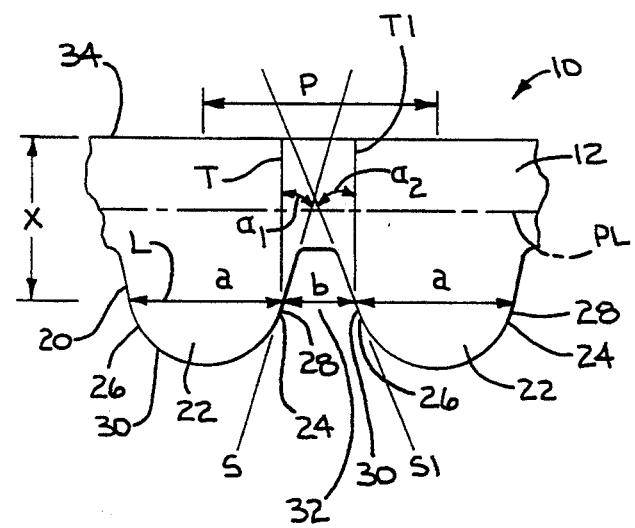
FIG. 2 is an enlarged, fragmentary, side elevation view of the belt in FIG. 1.
Figure 3:
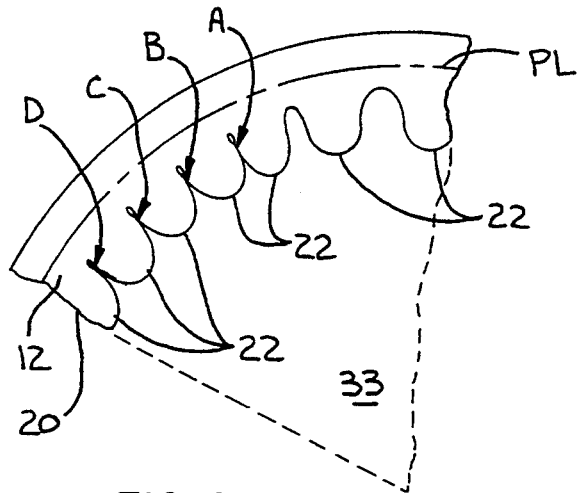
FIG. 3 is a fragmentary, side elevation view of the belt in FIGS. 1 and 2 wrapped around a cooperating pulley so that individual cogs thereon are brought into contact with each other.

In FIGS. 1-3, a cogged V-belt, according to the present invention, is shown at 10. The belt 10 has a body 12 including an adhesion layer 14 made of an elastic material, such as rubber or elastic synthetic resin. Laterally spaced, longitudinally extending, load-carrying cords 16 are embedded in the adhesion layer 14. The cords 16 are preferably made from fibers having low elasticity and high strength. For example, the cords 16 may be made from polyester, polyamide, and/or aromatic polyamide fibers. At least one fabric layer 18 is provided on the outside of the belt 10. The fabric may be a bias or stretchable canvas. A compression layer 20 is provided on the inside of the belt 10 and may be made from the same material as that from which the adhesion layer 14 is made. The compression layer 20 is laminated to the adhesion layer 14.

Individual cogs 22 are defined in the compression layer 20. The cogs 22 have a rounded configuration. Each cog 22 has a leading flank 24 and a trailing flank 26 with oppositely facing, convex surfaces 28, 30, respectively. The cogs 22 are spaced at regular intervals along the entire length of the belt 10, with there being a space 32 defined between adjacent cogs 22. The cog pitch (P), which is equal to the sum of the length (a) of one cog and the space (b) between adjacent cogs, is thus constant over the belt length.

The general arrangement of the cogs 22, as described above, is conventional. The present invention is concerned with the length and shape of the cogs as well as the space 32 therebetween. More specifically, the ratio of the cog length (a) to the length (b) of the cog space between adjacent cog teeth 22 is chosen to be within the range of 3-10 so that adjacent cogs 22 will contact each other as the belt 10 is wrapped around a pulley 33, with which the belt cooperates in use, as seen in FIG. 3. The relative lengths (a), (b) are measured a predetermined distance (X) from the outside surface 34 of the belt 10, which distance (X) represents the distance from the outside surface 34 at which the cogs 22 initially contact each other in use. The dimensions (a), (b) are measured along a line (L) that is parallel to the belt pitch line (PL) at the distance (X) from the outside surface 34.

Further according to the invention, the flank surfaces 28, 30 have a preferred angular relationship. A leading cog angle $\alpha 1$ is measured between a line (S) that is tangent to the flank surface 24 where the flank surface 24 intersects the line (L) and a line (T) perpendicular to the pitch line (PL). The trailing cog angle $\alpha 2$ is defined between the tangent (S1) to the trailing flank surface 30 at the line (L) and the line (T1) perpendicular to the pitch line (PL). The sum of $\alpha 1$ and $\alpha 2$ is preferably not greater than 30°.

In the event that the cogs 22 are symmetrical about a line perpendicular to the pitch line (PL), the angles $\alpha 1$ and $\alpha 2$ are equal. However, certain cog belts have a non-symmetrical cog construction. For example, in a V-belt used for motor scooters, the leading cog angle $\alpha 1$ is not equal to the trailing cog angle $\alpha 2$.

As seen in FIG. 3, as the belt 10 wraps around a pulley, the cogs 22, having the configuration and spacing described above, will be brought into engagement with each other in succession as the belt 10 wraps around the pulley 33 having a diameter of 60 to 130 mm. The cogs 22 could, of course, be configured and spaced to abut to each other with the belt 10 operated on pulleys outside this range.

As the cogs 22 move into the pulley 33, adjacent cogs 22 move towards each other to thereby progressively shorten the length of the space 32 until the cogs 22 contact each other, which progression is seen in FIG. 3. The space 32 is then closed either partially as shown for the cog pairs at A, B, C, or completely, as shown for the cog pair D. The result of the space reduction/elimination is that the abutted cogs 22 and pulley 33 define a solid mass which does not generate the unwanted "pitch noise".

The ratio (a)/(b) is within the range of 3-10 for the following reasons. If the ratio (a)/(b) is less than 3, the cog space length (b) is too long and the belt 10 must be bent to a very small radius in order to bring adjacent cogs 22 into contact with each other on the pulley 33. It may be impossible to eliminate the space 32 with such a construction in a normal system.

On the other hand, if the ratio (a)/(b) is not less than 10, the cog length (a) is too long and the adjacent cogs 22 are brought into contact with each other on even a very large radius pulley. This greatly detracts from the flexibility of the belt 10.

The sum of the leading cog angle $\alpha 1$ and trailing cog angle $\alpha 2$ is preferably less than 30° for the following reasons. If the sum is 30° or more, the belt 10 must be bent to a very small radius to bring the cogs 22 into contact with each other. In larger pulley systems, the cog space cannot be eliminated, whereby the noise suppressing affects would not be realized.

Figure 4:
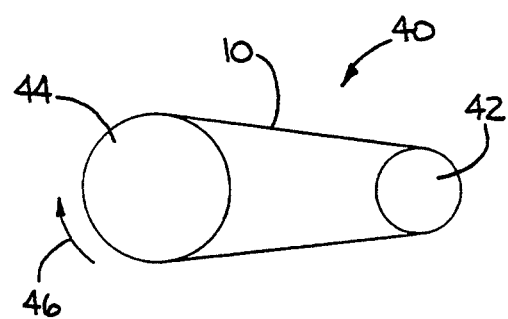
FIG. 4 is a schematic representation of a system for testing noise generation on a running belt.

In Table I, below, physical dimensions and noise producing characteristics of the inventive belt and a comparative, conventional belt sample are set out. The comparative sample did not have cog-to-cog contact during testing. The test setup used to generate the noise data for both belts is shown schematically at 40 in FIG. 4.

TABLE 1

|  | Comparative Sample | Inventive Belt |
| --- | --- | --- |
| Cog pitch (P) (mm) | 8.7 | 8.7 |
| Cog length (a) (mm) | 5.5 | 6.9 |
| Cog space length (b) (mm) | 3.2 | 1.8 |
| Cog angle $\alpha 1$ (°) | 16 | 7.5 |
| Cog angle $\alpha 2$ (°) | 16 | 7.5 |
| Absence/presence | Detected | Not detected |

TABLE 1-continued

| | Comparative Sample | Inventive Belt |
|---|---|---|
| of pitch noise | | |

Note: P = a + b

Figure 5:
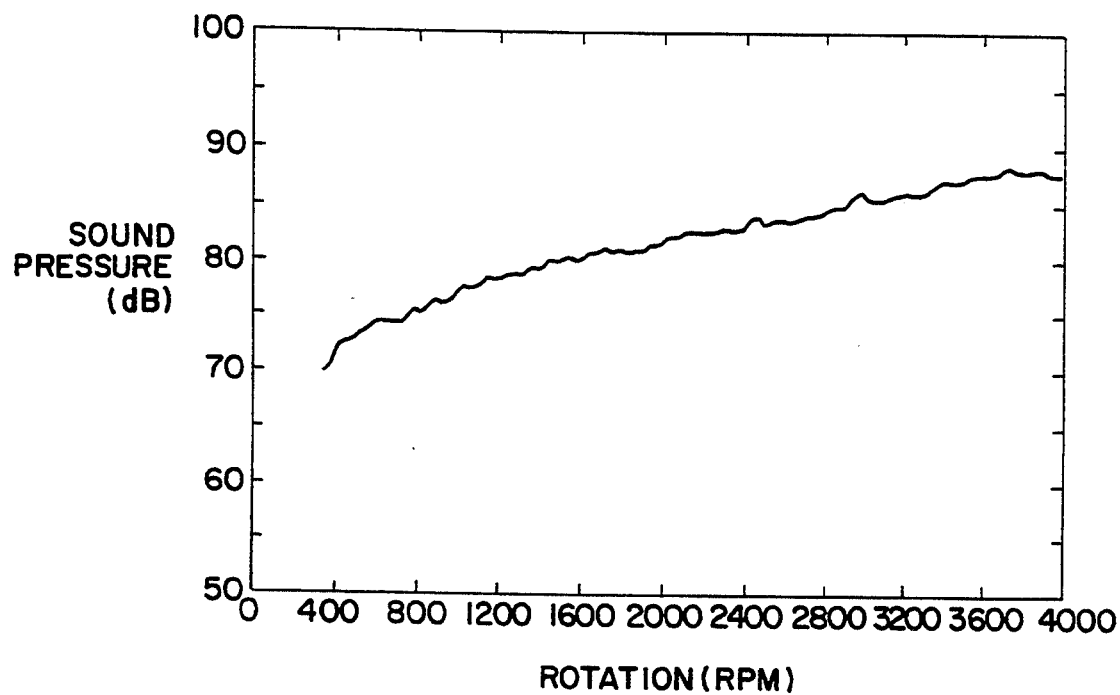
FIG. 5 is a graph plotting sound pressure generated by the inventive belt over a range of rotational speeds.

The test setup 40 included a V-grooved driving pulley 42, with a diameter of 120 mm, and a V-grooved driven pulley 44, with a diameter of 65 mm. Rotation was in the direction of the arrow 46. A-type cogged V-belts with a length of 995 mm were separately trained around the pulleys 42, 44 and driven. The belts were accelerated under 30 kgf belt tension with no load until the speed of the driving pulley reached 4,000 rpm. The sound pressure at various speeds were measured and graphed. FIG. 5 is a graph of sound pressure values for a range of rotational speeds for the inventive belt, with FIG. 6 being the same graph for the comparative sample.

Figure 6:
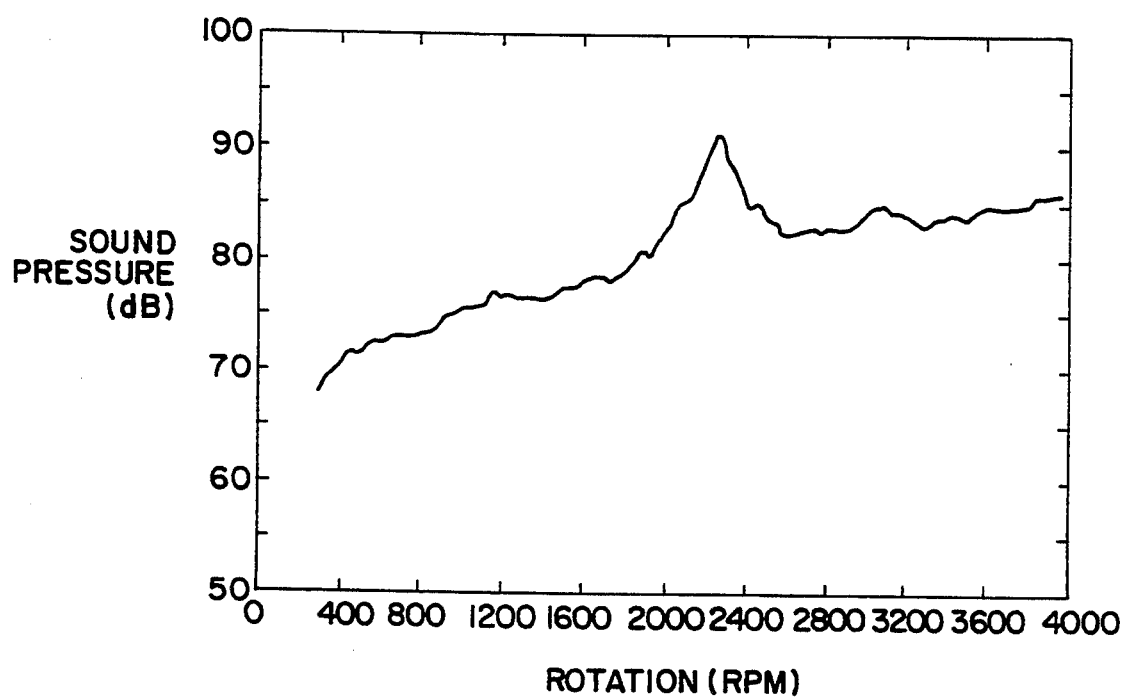
FIG. 6 is a graph similar to that in FIG. 5 for a conventional belt.

From the test results, it can be seen that the inventive V-belt 10 that was tested exhibited no extreme cog-induced changes in sound pressure level or "pitch noise" as the sound pressure increased. In contrast, FIG. 6 shows that the comparative sample showed a remarkable "pitch noise" jump to 92 decibels when the speed of the pulley reached approximately 2,260 rpm.

In addition to the noise suppression afforded by the inventive belts, the inventive belts are resistant to cracking in the cog spaces, even under high load and high temperature conditions. This cracking in conventional belts is attributable to shear stress occurring in the circumferential direction.

The foregoing disclosure of specific embodiments is intended to be illustrative of the broad concepts comprehended by the invention.

We claim:

1. A power transmission belt comprising:
   a belt body having a length; and
   a plurality of cogs spaced lengthwise along the belt body for engaging a pulley with which the belt cooperates,
   wherein adjacent cogs are configured and relatively located so that the adjacent cogs contact each other as the power transmission belt is wrapped around a cooperating pulley having a diameter of 60 to 130 mm.

2. The power transmission belt according to claim 1 wherein the power transmission belt is a V-belt.

3. The power transmission belt according to claim 1 wherein the power transmission belt has a longitudinal pitch line and an outside surface, the adjacent cogs contact each other at a predetermined distance from the outside surface and the ratio of the length of the adjacent cogs, taken along a first line parallel to the pitch line at said predetermined distance from the outside surface, to the length of the space between the adjacent cogs along said first line is between 3 and 10.

4. The power transmission belt according to claim 1 wherein the power transmission belt has a longitudinal pitch line and an outside surface, the adjacent cogs contact each other at a predetermined distance from the outside surface, the adjacent cogs have adjacent leading and trailing flank surfaces, a line tangent to the leading flank surface at said predetermined distance from the outside surface makes an angle $\alpha 1$ with a line perpendicular to the pitch line, a line tangent to the trailing flank surface at said predetermined distance from the outside surface makes an angle $\alpha 2$ with a line perpendicular to the pitch line and the sum of $\alpha 1$ and $\alpha 2$ is not greater than 30°.

5. The power transmission belt according to claim 4 wherein $\alpha 1$ is approximately equal to $\alpha 2$.

6. The power transmission belt according to claim 4 wherein $\alpha 1$ is not equal to $\alpha 2$.

7. The power transmission belt according to claim 1 in combination with a pulley to receive the power transmission belt and having a diameter of 60 to 130 mm.

8. The power transmission belt according to claim 1 wherein the adjacent cogs have adjacent leading and trailing flank surfaces and the leading and trailing flank surfaces are convex.

9. The power transmission belt according to claim 1 wherein the power transmission belt has laterally spaced, longitudinally extending load carrying cords made from at least one of polyester, polyamide, and aromatic polyamide fibers.

10. The power transmission belt according to claim 9 wherein the load carrying cords are embedded in an adhesion layer that is at least one of rubber and elastic synthetic resin.

11. The power transmission belt according to claim 1 wherein the power transmission belt has an outside surface defined by fabric that is at least one of a bias and stretchable canvas.

12. A power transmission system comprising:
    a power transmission belt comprising a belt body having a length and a plurality of cogs spaced lengthwise along the belt body; and
    a pulley having a drive/driven surface to be engaged by the power transmission belt,
    wherein adjacent cogs are configured and relatively located so that the adjacent cogs contact each other as the power transmission belt wraps around the pulley.

13. The power transmission system according to claim 12 wherein the power transmission belt is a V-belt.

14. The power transmission system according to claim 12 wherein the power transmission belt has a longitudinal pitch line and an outside surface, the adjacent cogs contact each other at a predetermined distance from the outside surface and the ratio of the length of the adjacent cogs, taken along a first line parallel to the pitch line at said predetermined distance from the outside surface, to the length of the space between the adjacent cogs along said first line is between 3 and 10.

15. The power transmission system according to claim 12 wherein the power transmission belt has a longitudinal pitch line and an outside surface, the adjacent cogs contact each other at a predetermined distance from the outside surface, the adjacent cogs have adjacent leading and trailing flank surfaces, a line tangent to the leading flank surface at said predetermined distance from the outside surface makes an angle $\alpha 1$ with a line perpendicular to the pitch line, a line tangent to the trailing flank surface at said predetermined distance from the outside surface makes an angle $\alpha 2$ with a line perpendicular to the pitch line and the sum of $\alpha 1$ and $\alpha 2$ is not greater than 30°.

16. The power transmission system according to claim 15 wherein $\alpha 1$ is approximately equal to $\alpha 2$.

17. The power transmission system according to claim 15 wherein $\alpha 1$ is not equal to $\alpha 2$.

18. The power transmission system according to claim 12 wherein the adjacent cogs have adjacent leading and trailing flank surfaces and the leading and trailing flank surfaces are convex.

19. The power transmission system according to claim 12 the power transmission belt has laterally spaced, longitudinally extending load carrying cords made from at least one of polyester, polyamide, and aromatic polyamide fibers.

20. The power transmission system according to claim 12 wherein the power transmission belt has an outside surface defined by fabric that is at least one of a bias and stretchable canvas.

21. The power transmission system according to claim 12 wherein the cogs are spaced a predetermined distance from each other along the entire length of the power transmission belt.

* * * * *